(12) United States Patent
Sleiman (10) Patent No.: US 7,597,215 B2
(45) Date of Patent: Oct. 6, 2009

(54) SUPPLY SYSTEM FOR A BOTTLED WATER COOLER USING A MICROCONTROLLER AND METHOD OF USE

(76) Inventor: Ali Ahmed Sleiman, 4555 Brompton Ave., Bell, CA (US) 90201

( * ) Notice: Subject to any disclaimer, the term of this patent is extended or adjusted under 35 U.S.C. 154(b) by 0 days.

(21) Appl. No.: 11/433,851

(22) Filed: May 15, 2006

(65) Prior Publication Data

US 2007/0278243 A1 Dec. 6, 2007

(51) Int. Cl.
*B67D 5/08* (2006.01)
(52) U.S. Cl. .............. 222/65; 222/56; 222/64; 222/66; 222/146.1; 62/389; 141/198
(58) Field of Classification Search ............ 222/64–67, 222/56, 61, 1, 146.1, 325, 146.2, 146.6, 129.1, 222/185.1; 62/389–391; 141/198, 323
See application file for complete search history.

(56) References Cited

U.S. PATENT DOCUMENTS

| | | | | |
|---|---|---|---|---|
| 3,495,612 A | * | 2/1970 | Learn et. al. ............... | 137/209 |
| 4,030,634 A | * | 6/1977 | Osborn ...................... | 222/23 |
| 4,958,747 A | * | 9/1990 | Sheets ......................... | 222/67 |
| 5,495,725 A | * | 3/1996 | Middlemiss ................ | 62/389 |
| 5,540,355 A | * | 7/1996 | Hancock et al. ............. | 222/56 |
| 5,901,880 A | * | 5/1999 | Clarke ........................ | 222/63 |
| 6,155,460 A | * | 12/2000 | Lee ........................ | 222/146.6 |
| 6,453,955 B1 | * | 9/2002 | Lee ............................ | 141/198 |
| 6,793,099 B1 | * | 9/2004 | Sleiman ..................... | 222/67 |
| 7,131,556 B2 | * | 11/2006 | Tseng ........................ | 222/64 |

* cited by examiner

*Primary Examiner*—Frederick C. Nicolas
(74) *Attorney, Agent, or Firm*—Timothy Thut Tyson; Ted Masters; Freilich, Hornbaker & Rosen

(57) ABSTRACT

A supply system and method for providing water from a bottled water cooler includes a pump which pumps water from an upright bottle of water into a water reservoir in the bottled water cooler. A control device using a microcontroller monitors upper and lower sensors which are disposed in the water reservoir, and controls the operation of the pump so that the water level in the reservoir goes no lower than the lower sensor, and goes no higher than the upper sensor. The control device also monitors a sensor disposed at the bottom of the bottle of water, and de-energizes the pump if the bottle of water is empty.

14 Claims, 8 Drawing Sheets

Fig_3

Fig_4

Fig-5

* PUMP ENERGIZED
   UNTIL Y = CLOSED

SUPPLY SYSTEM FOR A BOTTLED WATER COOLER USING A MICROCONTROLLER AND METHOD OF USE

TECHNICAL FIELD

The present invention pertains generally to bottled water coolers, and more particularly to a water supply system that allows the bottle of water to be located on the floor adjacent the bottled water cooler rather than in the conventional inverted position on top of the bottled water cooler.

BACKGROUND OF THE INVENTION

Water cooler systems that allow the bottle of water to be placed on the floor rather than on top of the water cooler are well known in the art. For example, U.S. Pat. No. 6,793,099 shows a supply system for providing water from a bottled water cooler including a pump that pumps water from an upright bottle of water. A pressure sensor turns the pump off when the bottle of water is empty. A prime pump control starts the pump to initiate the flow of water from a new bottle of water.

U.S. Pat. No. 6,155,460 shows a pump and water bottle in a cabinet. A regulator controls the level of water in the dispensing water reservoir. A sensor turns the pump off when the water bottle is empty.

U.S. Pat. No. 6,056,154 illustrates a water dispensing system for taking water from a container positioned near the ground and transporting the water up to a water reservoir. A sensor detects the water level in the reservoir. The sensor activates a pump through a circuit to cause the pump to move water to the reservoir when the water in the reservoir falls below a predetermined level.

U.S. Pat. No. 5,901,880 shows a bottled water delivery system having a pump that moves water from a bottle to a desired output location. Heavy water bottles need not be moved and may be located at a significant pre-selected distance from the output location. A controller is provided to keep the pump from being actuated when there is no water available for pumping. A float indicates when the water bottle is empty.

U.S. Pat. No. 5,638,991 shows a bottled water dispenser having an upright five-gallon bottle on a dolly. The dolly and bottle are wheeled into the bottom of the dispenser. A tube with a rubber stopper at one end and a check valve at the other end is inserted into the bottle. A button on the dispenser is pushed to activate an internal electric pump. The pump draws water from the bottle through the check valve and forces it out of the spigot under pressure. Internal solenoid valves direct the water through a heating unit, cooling unit, or filtration system before the water exits through the spigot.

U.S. Pat. No. 5,540,355 describes a water cooler and dispensing system having a housing, a pump, a cap, a siphon tube, a water reservoir, a cooling unit, control circuitry and a faucet. The housing supports the water reservoir above a water bottle. The cap seals the bottle and is coupled to the pump. Air is pumped into the bottle forcing water upward through the siphon tube to the water reservoir. A liquid pumping system may also be used. The dispenser has control circuitry for selectively operating the pump to maintain a predetermined water level in the water reservoir. The controller lights an indicator when the bottle is empty.

U.S. Pat. No. 5,495,725 describes a water transport system that transfers water from an upright water bottle below a water reservoir into the reservoir whenever the water in the reservoir falls below a predetermined level. A pipe carries water from the bottle through a sealed closure in the neck of the bottle up into the reservoir when air pressure is supplied to the bottle. An air pump in a housing atop the water reservoir provides air under pressure to the bottle through a tube that pass through the closure into the bottle. A water level sensor in the reservoir stops the pump when the water reaches a predetermined level.

U.S. Pat. No. 4,958,747 shows a bottled water dispenser. A pump suctions water from an upright bottle and delivers it to a water reservoir in the dispenser above the bottle. A sensor indicates the level of water in the reservoir.

U.S. Pat. No. 4,153,181 shows water bottle dispensing unit including an air pump for pressurizing the bottle, a microswitch having a control button connected in circuit with the pump, a small pressure chamber with a distensible diaphragm for a top, a branched air line connecting the pump with the bottle and the pressure chamber, and a cabinet that can be positioned around the upright bottle. A water line extends upwardly from the bottle. A rubber cap encloses the bottle opening, the water line, and a branch of the air line that passes into the bottle. The water line reaches to the bottom of the bottle. The microswitch is normally closed and the pressure chamber is positioned with its diaphragm close to the control button of the switch. When the air pressure in the bottle exceeds a certain limit, the diaphragm bulges outwardly into contact with the button and opens the microswitch. When water is pushed from the bottle through the water line, the air pressure drops, and the diaphragm shrinks away from the control button. This causes the microswitch to close and start the air pump operating to again build up air pressure in the bottle. The pump will automatically shut off if there is no water in the bottle.

U.S. Pat. No. 4,030,634 describes a dispenser for transferring water from a standard five-gallon water bottle to a dispenser spout without the need for lifting the bottle and inverting it atop the dispenser. The device includes a pump, ducting to carry water from the bottle to the dispenser, and various control sensors and indicators to control pressure and water flow so that potable water from the dispenser is available on demand. The device has a water reservoir water level sensor and control.

U.S. Pat. No. 3,495,612 shows a water pumping and control system for a bottled supply water cooler apparatus where the supply is located below a cooling chamber. The water is forced from the supply bottle up to the cooling chamber by a pump until the desired water level is reached in the cooling chamber.

SUMMARY OF THE INVENTION

The present invention is directed to a supply system and method using a microcontroller for dispensing water from a bottled water cooler. A bottle of water is placed in an upright position adjacent the bottled water cooler rather than in the conventional inverted position on top of the cooler. There is no need to pick up the bottle of water and place it on top of the cooler. The present invention is intended to benefit those individuals who are unable to handle the heavy bottle of water.

The supply system may be conveniently added to an existing bottled water cooler by placing a housing that contains components of the supply system on top of the bottled water cooler. Alternatively, the supply system may be physically integrated into the bottled water cooler housing. It is also noted that the concepts of the present invention could be applied to any two tank liquid system.

In accordance with a preferred embodiment, the supply system includes a pump that pumps water from the upright bottle of water into a water reservoir in the cooler. A control device using a microcontroller monitors upper and lower sensors that are disposed in the water reservoir, and controls the operation of the pump so that the water level in the reservoir goes no lower than the lower sensor, and goes no higher than the upper sensor. The control device also monitors a sensor disposed at the bottom of the bottle of water and de-energizes the pump if the bottle of water is empty. The pump has an input and an output. The input is connected to a conduit that passes into the bottle. The output is connected to the water reservoir. The bottle sensor, the upper reservoir sensor, and the lower reservoir sensor each have an open non-conductive state and a closed conductive state. The control device (1) checks the state of the bottle sensor, the state of the upper reservoir sensor, and the state of the lower reservoir sensor, (2) causes the pump to energize if the bottle sensor is in the closed state and both the upper reservoir sensor and the lower reservoir sensor are in the open state, and (3), after (2), causes the pump to de-energize when the upper reservoir sensor is in the closed state.

In accordance with an aspect of the invention, the control device causes the pump to de-energize if the bottle sensor is in the open state.

In accordance with another aspect of the invention, the control device includes a change bottle indicator, which illuminates if the bottle sensor is in the open state.

In accordance with another aspect of the invention, the control device includes a pump ready indicator, which illuminates when the bottle sensor is in the closed state and both the upper reservoir sensor and the lower reservoir sensor are in the open state.

In accordance with another aspect of the invention, the bottle sensor, the upper reservoir sensor, and the lower reservoir sensor each include a pair of spaced apart electrodes. The closed state is determined when the electrodes of a sensor are shorted by water being present between them so they pass a current. The open state is determined when the electrodes of a sensor are not shorted by water between them so that a current will not pass.

In accordance with another aspect of the invention a gap of substantially 10 millimeters between the electrodes of a sensor have been found to be useful for detecting the presence or absence of water.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
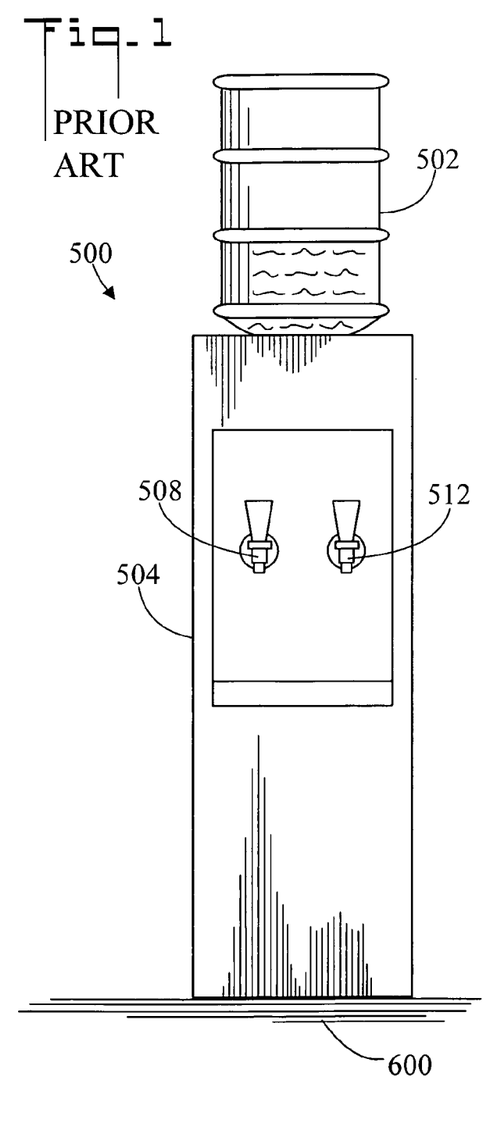
FIG. 1 is a front elevation view of a prior art bottled water cooler.
Figure 2:
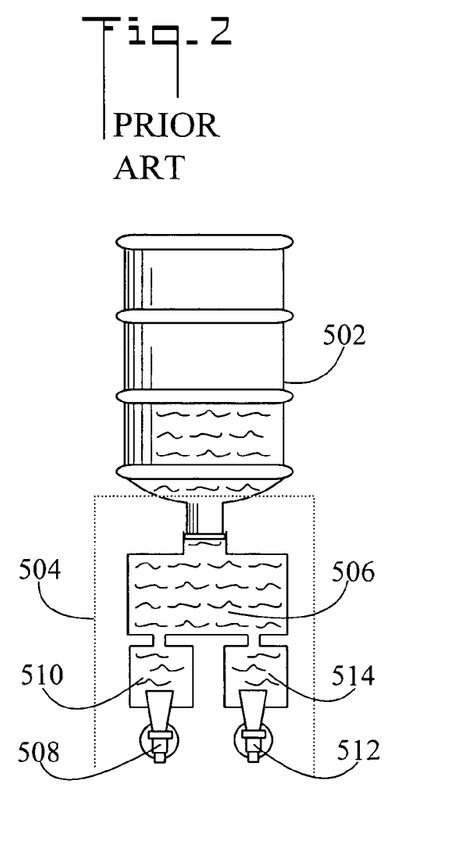
FIG. 2 is a front elevation breakaway view showing the water flow within the prior art bottled water cooler.

FIGS. 1 and 2 illustrate, respectively, a front elevation view of a prior art bottled water cooler 500 and a front elevation breakaway view showing the water flow within the prior art bottled water cooler 500. Bottled water cooler 500 includes a bottle of water 502, which is placed in an inverted position on top of the housing 504. The water in bottle 502 is feed by gravity into a water reservoir 506. Water reservoir 506 supplies chilled water to a faucet 508 via a chilling unit 510, and supplies heated water to a faucet 512 via a heating unit 514. The bottled water cooler resides on a support surface 600.

Figure 3:
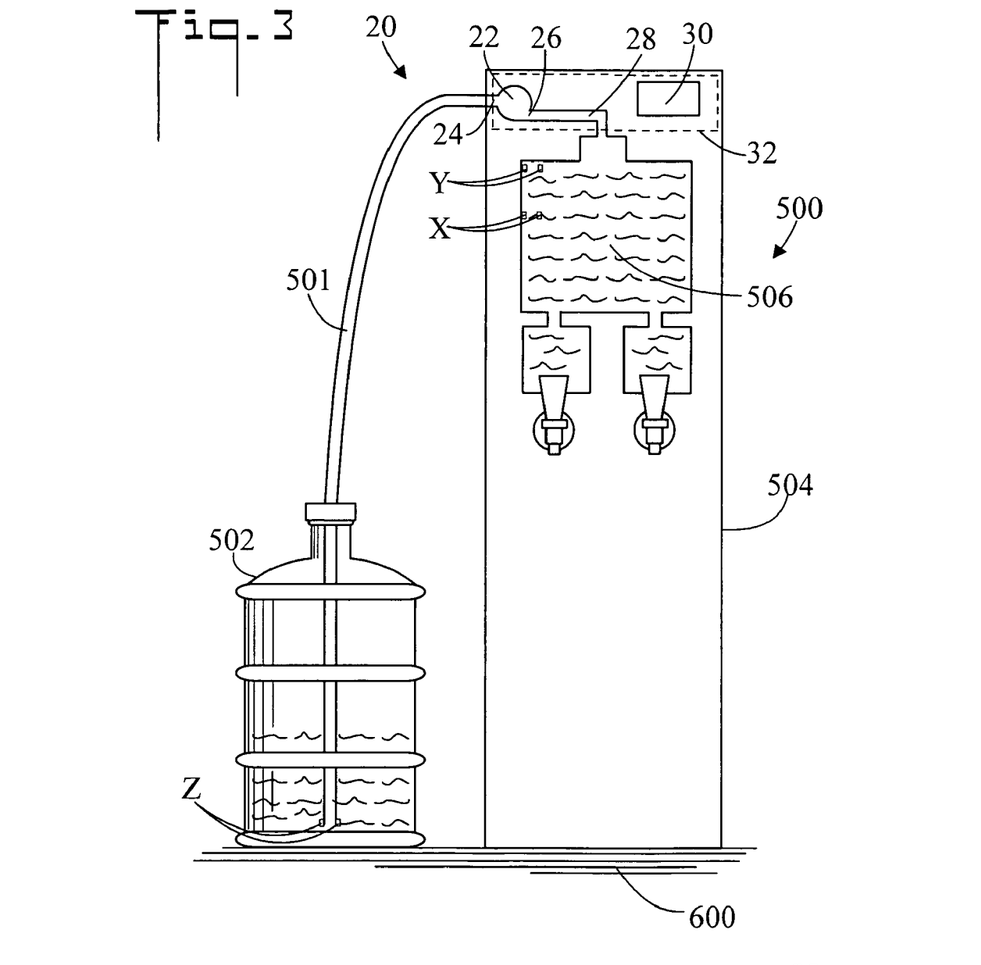
FIG. 3 is a front elevation breakaway view of a supply system built into a bottled water cooler in accordance with the present invention.
Figure 4:
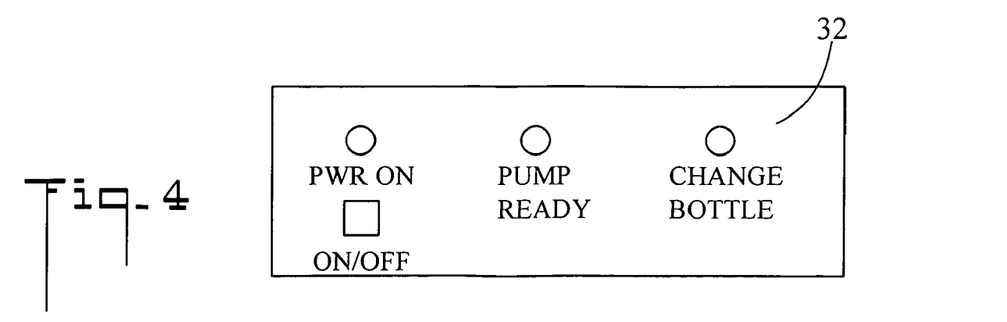
FIG. 4 is an enlarged view of a control panel for the supply system.
Figure 5:
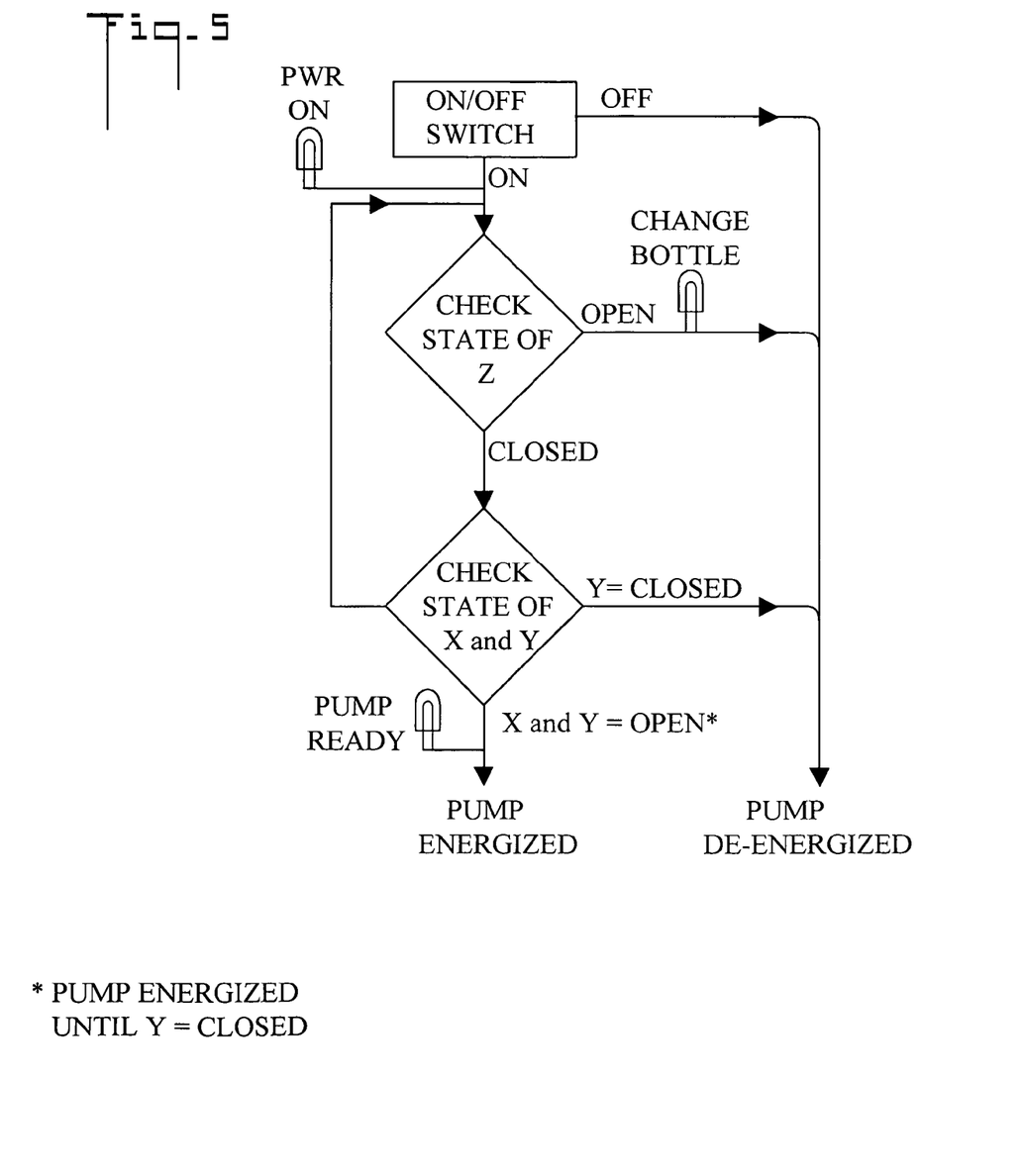
FIG. 5 is a functional flow diagram of the supply system.

FIGS. 3-5 illustrate a front elevation breakaway view, an enlarged control panel view, and a functional flow diagram, respectively, of a supply system built into a bottled water cooler in accordance with the present invention, the supply system generally being designated as 20. It is noted that in the present invention, the bottle of water 502 is not placed in an inverted position on top of the bottled water cooler housing 504 of the bottled water cooler 500, but rather resides in an upright position adjacent to and on the same support surface 600 as the housing 504 of the bottled water cooler 500. The bottle of water may also be located within the housing 504. The bottled water cooler 500 includes a bottle of water 502 which is in an upright position on the support surface 600, a conduit 501 such as a tube for removing water from bottle of water 502, and a water reservoir 506. Supply system 20 includes a pump 22 which has an input 24 and an output 26. Input 24 is connected to conduit 501, and output 26 is connected to water reservoir 506 via a conduit 28. When energized, pump 22 pumps water from bottle of water 502 to reservoir 506.

Figure 11:
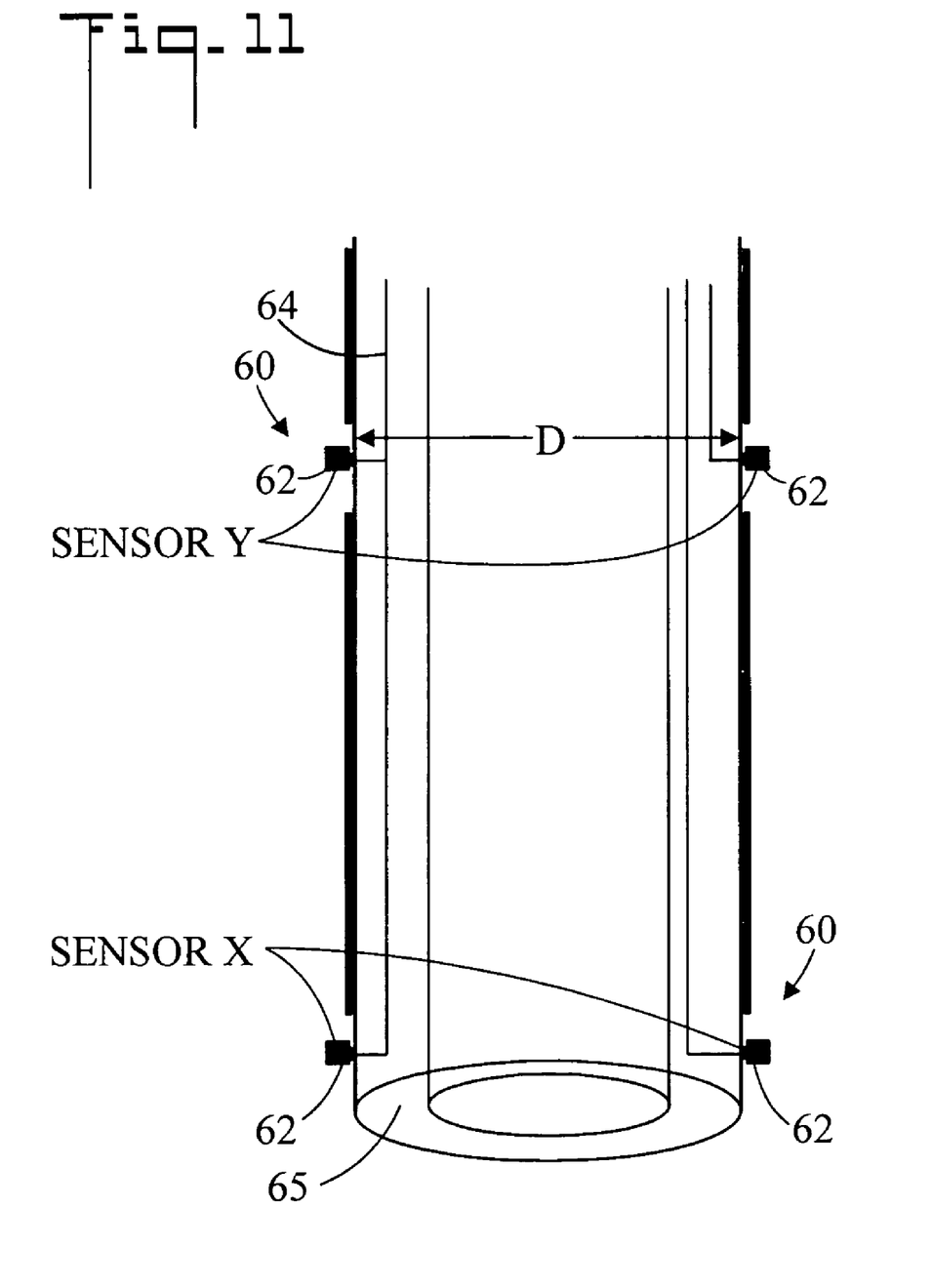

A bottle sensor Z is disposed in bottle of water 502 and positioned near the bottom. An upper reservoir sensor Y is disposed in water reservoir 506, and a lower reservoir sensor X is disposed in water reservoir 506 at a position below upper reservoir sensor Y. Bottle sensor Z, upper reservoir sensor Y, and lower reservoir sensor X each has a pair of spaced apart stainless steel electrodes that actually contact the water. An enlarged view of the stainless steel electrodes 60 is shown in FIG. 11. The sensors are in an open state when the two electrodes are not shorted by being immersed in water and do not pass a current. The sensors are in a closed state when the electrodes are shorted by being immersed in water and do pass a current when the water electrically closes the gap between the two electrodes.

A control device 30 having a microcontroller is electrically connected (see FIG. 9 for connections) to pump 22, bottle sensor Z, upper reservoir sensor Y, and lower reservoir sensor X. Control device 30 controls the operation of supply system 20 by (1) continuously checking the state (open or closed) of bottle sensor Z, upper reservoir sensor Y, and lower reservoir sensor X, (2) causing pump 22 to energize if bottle sensor Z is in the closed state and both upper reservoir sensor Y and lower reservoir sensor X are in the open state, and (3), after pump 22 is energized, causing pump 22 to de-energize when upper reservoir sensor Y is in the closed state. That is, control device 30 turns on pump 22 when the water level in water reservoir 506 drops below lower reservoir sensor X, and turns pump 22 off when the water level reaches upper reservoir sensor Y. This ensures that the water level in water reservoir 506 is always between the upper reservoir sensor Y and lower reservoir sensor X.

Supply system 20 also includes a control panel 32 that has a switch and indicators for the system. After the sensors have been read by the control device 30, a PUMP READY indicator (LED) illuminates if the pump 22 should be turned on. An ON/OFF switch determines if the pump power circuit is actually on or off. An associated PWR ON indicator (LED) shows when power is available in the pump circuit. Only when both the PUMP READY indicator and the PWR ON indicator are lit does the pump actually pump water from the bottle to the reservoir. A CHANGE BOTTLE indicator (blinking LED) illuminates if bottle of water 502 is empty.

FIG. 5 illustrates a functional flow diagram of supply system 20 showing under what conditions pump 22 is energized or de-energized. "Pump energized" means that pump 22 is turned on and thereby pumps water from bottle of water 502 to water reservoir 506 (refer to FIG. 3). Conversely, "pump de-energized" means either that pump 22 is not turned on, or that if it is on, it is turned off. When the ON/OFF power switch is turned on the PWR ON light illuminates. If the power switch is turned off, the pump 22 is de-energized. Control device 30 checks the state of bottle sensor Z. If bottle sensor Z is in the open state, bottle 502 must be empty and therefore control device 30 causes pump 22 to be de-energized. Also, when bottle sensor Z is in the open state, control device 30 causes the CHANGE BOTTLE indicator to illuminate.

Control device 30 also checks the state (open or closed) of upper reservoir sensor Y, and lower reservoir sensor X. If bottle sensor Z in the closed state and both upper reservoir sensor Y and lower reservoir sensor X are in the open state, control device 30 turns on the PUMP READY indicator. If the pump power circuit is on as indicated by the PWR ON indicator, pump 22 turns on and pumps water from water bottle 502 to water reservoir 506 until the water rises to upper reservoir sensor Y and causes it to enter the closed state. At that time, control device 30 causes pump 22 to de-energize. Control device 30 uses a microcontroller to continuously check the three sensors, and depending upon their state, causes the pump to be energize or de-energize.

Figure 6:
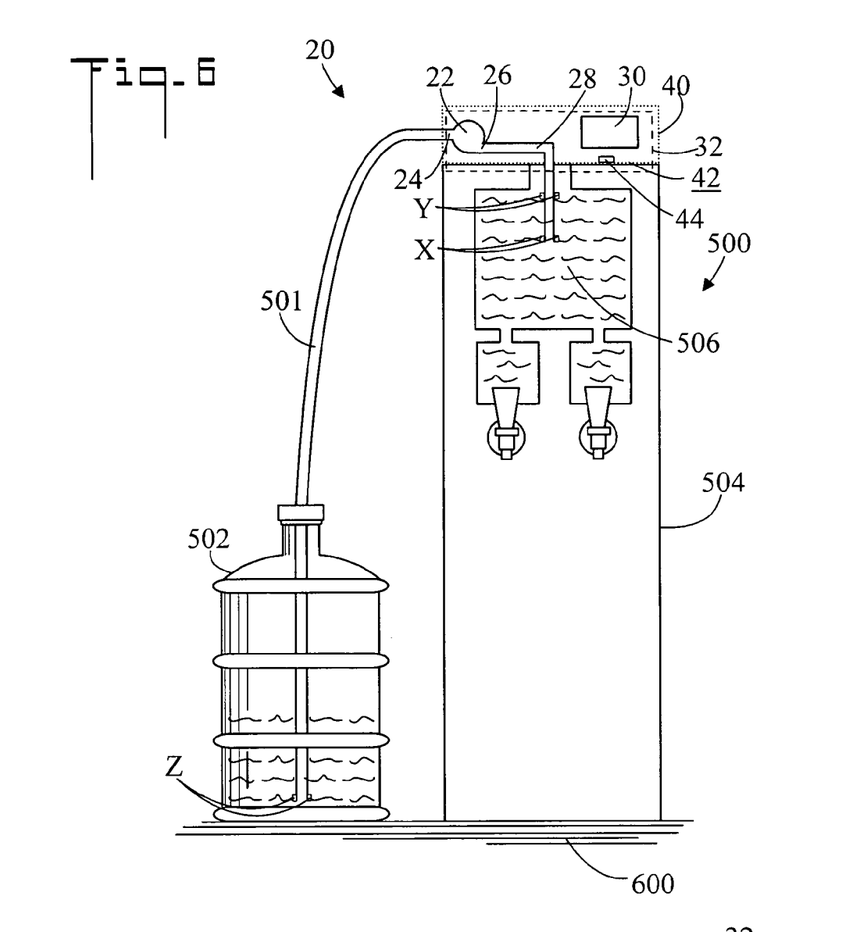
FIG. 6 is a front elevation breakaway view of a second embodiment of the supply system having a removable housing for a pre-existing bottle water cooler.
Figure 7:
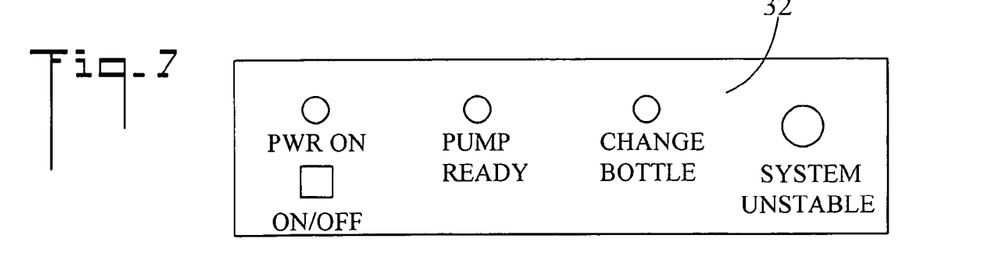
FIG. 7 is an enlarged view of a control panel for the second embodiment.
Figure 8:
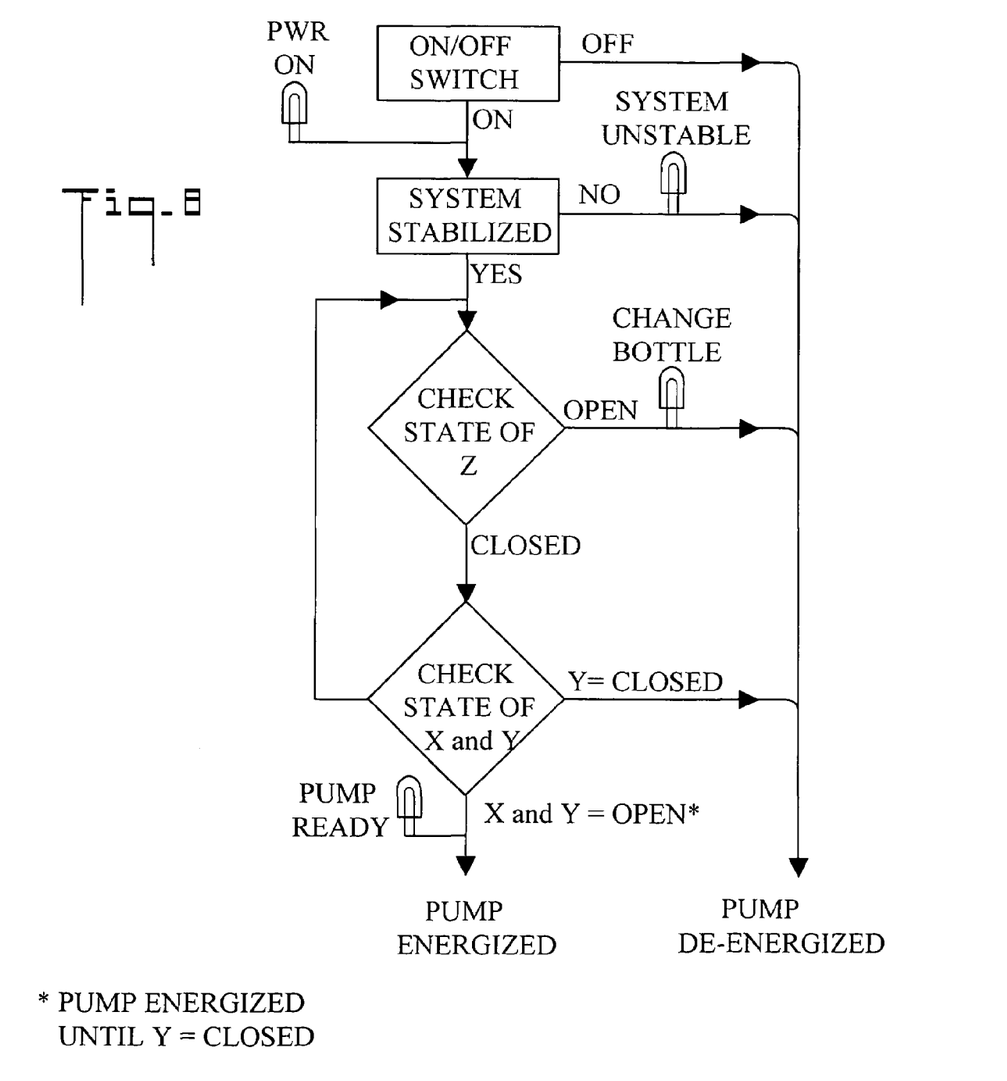
FIG. 8 is a functional flow diagram of the second embodiment.

FIGS. 6-8 illustrate a front elevation breakaway view, an enlarged control panel view, and a functional flow diagram, respectively, of a second embodiment of the supply system having a removable housing for a pre-existing bottled water cooler in accordance with the present invention. In this embodiment, pump 22 and control device 30 are disposed in a removable housing 40 having a bottom surface 42. At least one level interlock 44 is disposed on bottom surface 42 of removable housing 40. Level interlock 44 provides a system unstable signal to control device 30 if bottom surface 42 is not residing on a support surface, such as the top of bottled water cooler housing 504. Control device 30 causes pump 22 to de-energize if the system unstable signal is received from level interlock 44, and also causes a SYSTEM UNSTABLE indicator to illuminate on control panel 32. Refer to U.S. Pat. No. 6,793,099, for a description of the operation of the level interlock 44.

The supply system in the second embodiment is not physically packaged within the bottled water cooler 500, but rather comes as a separate removable housing 40 which can be placed on top of an existing bottled water cooler 500, or at another location. As such, the pump input 24 is connectable to conduit 501, and pump output 26 is connectable to water reservoir 506. Similarly, the bottle, upper reservoir, and lower reservoir sensors are designed for placement in bottle of water 502 and water reservoir 506, respectively.

Figure 9:
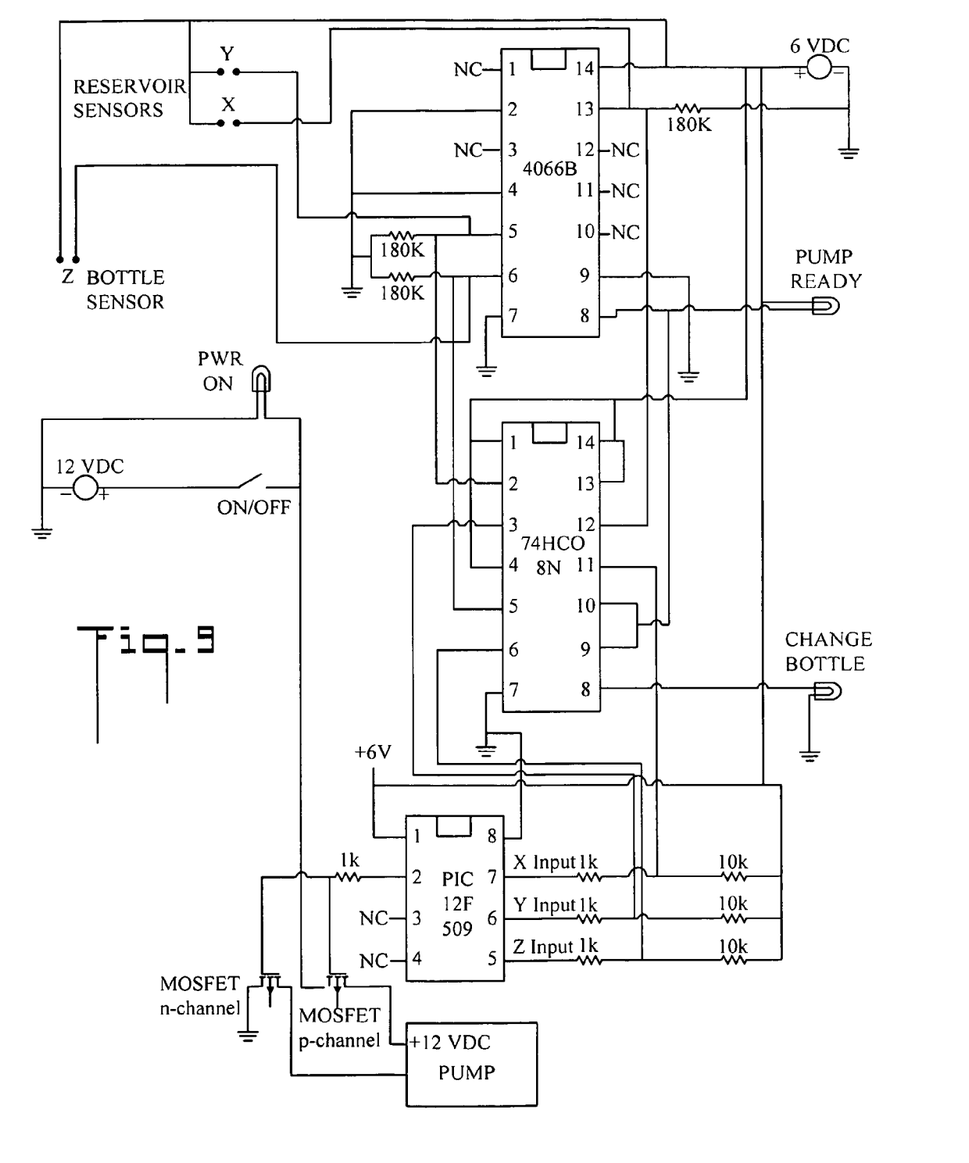
FIG. 9 is an electrical schematic diagram of the first embodiment of the supply system.
Figure 10:
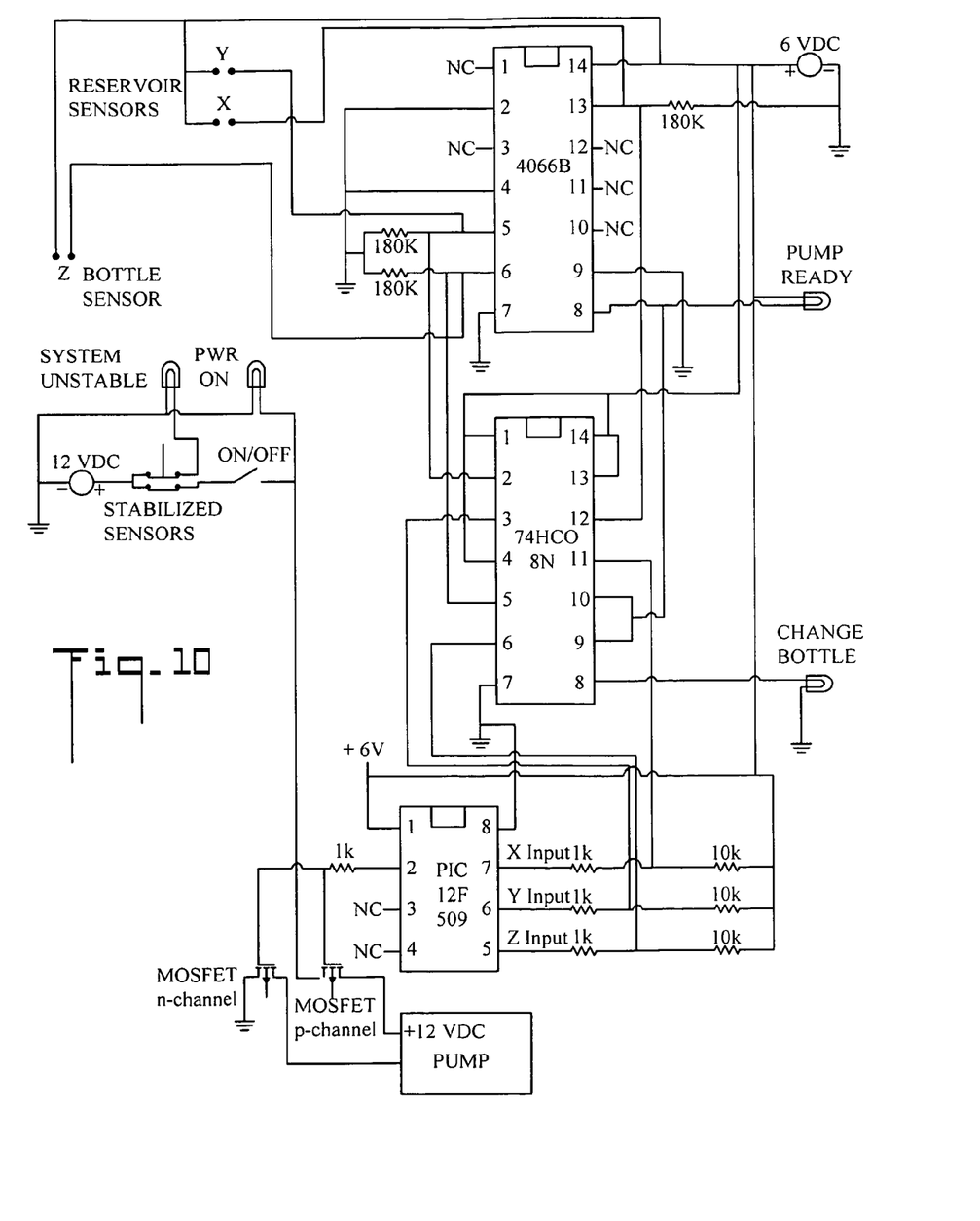
FIG. 10 is an electrical schematic diagram of the second embodiment of the supply system; and, FIG. 11 is an enlarged view of the upper and lower water reservoir sensors.

FIG. 9 is an electrical schematic diagram of the first embodiment of supply system 20. FIG. 10 is an electrical schematic diagram of the second embodiment of supply system 20, which includes the stabilized sensors of the level interlock. It will be appreciated that other electrical circuits could be created to provide the same functions. The following parts are utilized in each of the shown preferred embodiments:

One 14 pin quad bilateral switch HCF4066B sold by SGS-Thomson Microelectronics, S.A. of Gentilly, France One 14 pin quad 2-input AND gate 74HC08N sold by Koninklijke Philips Electronics, N.V. of Eindhoven, Netherlands One 8 pin 8-bit flash microcontroller PIC12F509 sold by Microchip Technology Incorporated of Chandler, Ariz.

Three 180 k ohm resistors

Four 1 k ohm resistors

Three 10 k ohm resistors

One n-channel MOSFET

One p-channel MOSFET 6 and 12 V DC power supplies (other voltages could be used)

LEDs

One pump

FIG. 11 is an enlarged view of upper and lower sensors Y and X of the second embodiment shown in FIG. 6. All X, Y, and Z sensors for both embodiments have similar construction. The Z sensors for both embodiments are similar to the figure but have only one sensor instead of the two shown in FIG. 11. The X and Y sensors of the first embodiment are attached to the wall of the reservoir instead of on a tube as shown in FIG. 11.

Each sensor 60 has two contact points 62 provided by two spaced apart stainless steel electrodes. A separation D of substantially 10 millimeters between the points 62 has been found to be useful for detecting the presence or absence of water found in water coolers and water cooler bottles. One of the two contact points 62 of each sensor is designated as the common contact point and is connected to the common contact points of all the other sensors 60. The wires 64 connecting the sensors 60 to control device 30 are insulated by being molded inside the walls of the plastic tube 65 which supplies water to water reservoir 506 (refer to FIG. 6) so that only the two stainless steel contact points 62 of each sensor 60 are exposed to the water. When the water level reaches a sensor 60, the two stainless steel contact points 62 becomes shorted by the water allowing them to pass a current thereby achieving a closed state. It will be appreciated that other conductors and spacings can be used to create the sensors.

In terms of use, a method for supplying water to a bottled water cooler 500 includes:

(a) providing a bottled water cooler 500 including a bottle of water 502 residing in an upright position, a conduit 501 for removing water from the bottle of water 502, and a water reservoir 506;

(b) providing a supply system 20 for bottled water cooler 500, supply system 20 including:

a pump 22 having an input 24 and an output 26, input 24 connected to conduit 501, and output 26 connected to water reservoir 506;

a bottle sensor Z disposed in bottle of water 500;

an upper reservoir sensor Y disposed in water reservoir 506;

a lower reservoir sensor X disposed in water reservoir 506 at a position below upper reservoir sensor Y;

bottle sensor Z, upper reservoir sensor Y, and lower reservoir sensor X each having an open state and a closed state; and, a control device 30 connected to pump 30, bottle sensor Z, upper reservoir sensor Y, and lower reservoir sensor X;

(c) control device 30 checking the state of bottle sensor Z, the state of the upper reservoir sensor Y, and the state of the lower reservoir sensor X;

(d) control device 30 causing pump 22 to energize if bottle sensor Z is in the closed state and both upper reservoir sensor Y and lower reservoir sensor X are in open states; and, (e) after step (d), control device 30 causing pump 22 to de-energize when upper reservoir sensor Y is in the closed state.

The method further including control device 30 causing pump 22 to de-energize if bottle sensor Z is in the open state.

The method further including:

providing a new full bottle of water;

in step (b), control device 30 including a change bottle indicator;

in step (c), the change bottle indicator illuminating if bottle sensor Z is in the open state; and, a user replacing the bottle of water 502 with a full bottle of water.

The preferred embodiments of the invention described herein are exemplary and numerous modifications, variations, and rearrangements can be readily envisioned to achieve an equivalent result, all of which are intended to be embraced within the scope of the appended claims.

I claim:

1. A supply system for a bottled water cooler, the bottled water cooler including a bottle of water residing in an upright position, a conduit for removing water from the bottle of water, and a water reservoir, said supply system comprising:

a pump having an input and an output, said input connected to the conduit, and said output connected to the water reservoir;

a bottle sensor disposed in the bottle of water;

an upper reservoir sensor disposed in the water reservoir;

a lower reservoir sensor disposed in the water reservoir at a position below said upper reservoir sensor;

said bottle sensor, said upper reservoir sensor, and said lower reservoir sensor each including a pair of spaced apart electrodes;

said bottle sensor, said upper reservoir sensor, and said lower reservoir sensor each having an open state and a closed state; and, a control device connected to said pump, said bottle sensor, said upper reservoir sensor, and said lower reservoir sensor, said control device (1) checking said open state and said closed state of said bottle sensor, said open state and said closed state of said upper reservoir sensor, and said open state and said closed state of said lower reservoir sensor, (2) causing said pump to energize if said bottle sensor is in said closed state and both said upper reservoir sensor and said lower reservoir sensor are in open states, and (3), after (2), causing said pump to de-energize when said upper reservoir sensor is in said closed state.

2. The supply system according to claim 1, further including said control device causing said pump to de-energize if said bottle sensor is in said open state.

3. The supply system of claim 1, further including said control device including a change bottle indicator, which illuminates if said bottle sensor is in said open state.

4. The supply system of claim 1, further including said control device including a pump ready indicator which illuminates when said bottle sensor is in said closed state and both said upper reservoir sensor and said lower reservoir sensor are in said open state.

5. The supply system according to claim 1, further including said electrodes being spaced substantially 10 millimeters from each other.

6. A supply system for a bottled water cooler, the bottled water cooler including a bottle of water residing in an upright position, a conduit for removing water from the bottle of water, and a water reservoir, said supply system comprising:

a pump having an input and an output, said input connected to the conduit, and said output connected to the water reservoir;

a bottle sensor disposed in the bottle of water;

an upper reservoir sensor disposed in the water reservoir;

a lower reservoir sensor disposed in the water reservoir at a position below said upper reservoir sensor;

said bottle sensor, said upper reservoir sensor, and said lower reservoir sensor each having an open state and a closed state;

a control device connected to said pump, said bottle sensor, said upper reservoir sensor, and said lower reservoir sensor, said control device (1) checking said open state and said closed state of said bottle sensor, said open state and said closed state of said upper reservoir sensor, and said open state and said closed state of said lower reservoir sensor, (2) causing said pump to energize if said bottle sensor is in said closed state and both said upper reservoir sensor and said lower reservoir sensor are in open states, and (3), after (2), causing said pump to de-energize when said upper reservoir sensor is in said closed state;

said control device causing said pump to de-energize if said bottle sensor is in said open state;

said control device including a change bottle indicator which illuminates if said bottle sensor is in said open state; and, said bottle sensor, said upper reservoir sensor, and said lower reservoir sensor each including a pair of spaced apart electrodes.

7. A supply system for a bottled water cooler, the bottled water cooler including a bottle of water residing in an upright position, a conduit for removing water from the bottle of water, and water reservoir, said supply system comprising:

a pump having an input and an output, said input connectable to the conduit, and said output connectable to the water reservoir;

a bottle sensor for placement in the bottle of water;

an upper reservoir sensor for placement in the water reservoir;

a lower reservoir sensor for placement in the water reservoir at a position below said upper reservoir sensor;

said bottle sensor, said upper reservoir sensor, and said lower reservoir sensor each including a pair of spaced apart electrodes;

said bottle sensor, said upper reservoir sensor, and said lower reservoir sensor each having an open state and a closed state; and, a control device connected to said pump, said bottle sensor, said upper reservoir sensor, and said lower reservoir sensor, said control device (1) checking said open state and said closed state of said bottle sensor, said open state and said closed state of said upper reservoir sensor, and said open state and said closed state of said lower reservoir sensor, (2) causing said pump to energize if said bottle sensor is in said closed state and both said upper reservoir sensor and said lower reservoir sensor are in open states, and (3), after (2), causing said pump to de-energize when said upper reservoir sensor is in said closed state.

8. The supply system of claim 7, further including said control device causing said pump to de-energize if said bottle sensor is in said open state.

9. The supply system of claim 7, further including said control device including a change bottle indicator, which illuminates if said bottle sensor is in said open state.

10. The supply system of claim 7, further including said control device including a pump ready indicator which illuminates when said bottle sensor is in said closed state and both said upper reservoir sensor and said lower reservoir sensor are in said open state.

11. The supply system according to claim 7, further including:
said pump and said control device disposed in a removable housing having a bottom surface;
at least one level interlock disposed on said bottom surface of said removable housing, said level interlock providing a system unstable signal to said control device if said bottom surface is not residing on a support surface; and,
said control device causing said pump to de-energize if said system unstable signal is present.

12. The supply system according to claim 11, further including said control device including a system unstable indicator which illuminates if said system unstable signal is received from said level interlock.

13. The supply system according to claim 7, further including said electrodes being spaced substantially 10 millimeters from each other.

14. A supply system for a bottled water cooler, the bottled water cooler including a bottle of water residing in an upright position, a conduit for removing water from the bottle of water, and water reservoir, said supply system comprising:
a pump having an input and an output, said input connectable to the conduit, and said output connectable to the water reservoir;
a bottle sensor for placement in the bottle of water;
an upper reservoir sensor for placement in the water reservoir;
a lower reservoir sensor for placement in the water reservoir at a position below said upper reservoir sensor;
said bottle sensor, said upper reservoir sensor, and said lower reservoir sensor each having an open state and a closed state;
a control device connected to said pump, said bottle sensor, said upper reservoir sensor, and said lower reservoir sensor, said control device (1) checking said open state and said closed state of said bottle sensor, said open state and said closed state of said upper reservoir sensor, and said open state and said closed state of said lower reservoir sensor, (2) causing said pump to energize if said bottle sensor is in said closed state and both said upper reservoir sensor and said lower reservoir sensor are in open states, and (3), after (2), causing said pump to de-energize when said upper reservoir sensor is in said closed state;
said control device causing said pump to de-energize if said bottle sensor is in said open state;
said control device including a change bottle indicator which illuminates if said bottle sensor is in said open state; and,
said bottle sensor, said upper reservoir sensor, and said lower reservoir sensor each including a pair of spaced apart electrodes.

* * * * *